United States Patent Office 2,980,253
Patented Apr. 18, 1961

2,980,253
FLOTATION PROCESSES

Magne Mortenson, Prestegaardsveien 2, Strinda, near Trondheim, Norway

No Drawing. Filed Mar. 2, 1954, Ser. No. 413,723

Claims priority, application Norway Apr. 18, 1953

1 Claim. (Cl. 209—166)

In processes for dressing of certain ores by flotation it is imperative that the concentration of the Ca and in some cases Mg ion in the pulp are controlled.

I have made the observation, that this control may be obtained by passing carbon dioxide into the pulp.

If the ore to be treated contains calc-spar, other carbonates or minerals soluble in mineral acids, it is impossible to decrease the pH value of the pulp sufficiently by means of mineral acid without adding very great quantities of such acid, and on account of this the resulting pulp contains great quantities of soluble Ca- and Mg salts. In many cases this fact entirely prevents economical flotation in acidic pulp. If, however, gaseous carbonic acid is passed into the pulp, the latter becomes effectively acidified for flotation purposes, without substantial amounts of carbonates and the like becoming dissolved.

In many cases, e.g. in the selective flotation of sulphide minerals, a lime-basic pulp is used in a first step and an acidic pulp in a next step. In such cases the products obtained by calcination of limestone are used to advantage, since the calcined lime obtained is used in the first step and the carbon dioxide liberated is used for precipitation of lime and acidifying the pulp in the acidic flotation step.

The following examples illustrate some embodiments of the invention.

*Example 1*

By washing on table of limestone from Söve in Telemark, Norway, which limestone contains heavy minerals, such as iron pyrite, copite, etc., a concentrate containing 10% iron pyrite, 4% copite and 30% limestone, and other substances may be obtained. This table concentrate is subjected to flotation, eventually after being first suitably subdivided. In an agitation tank, preceding the flotation cells carbon dioxide is blown into the pulp. To the same or a following tank are added a suitable amount of pine oil for frothing, about 50–70 g./t., and an alkaline xanthate, e.g. amyl xanthate, about 50–100 g./t.

*Example 2*

A chalcopyrite/iron pyrite ore from the Killingdal mines, Norway, containing about 6% chalcopyrite and about 78% iron pyrite, is after suitable crushing treated by selective flotation in the following manner:

For flotation of the chalcopyrite the ore is treated by xanthate flotation in lime-basic pulp, in well known manner. The tailings from the chalcopyrite flotation then go to iron pyrite flotation, which is effected after acidifying of the pulp by means of sulphuric acid.

Tests show that this acidifying may be obtained by means of blowing in carbon dioxide, decreasing the contents of soluble Ca in the pulp. Lime to be used for preparing of basic pulp for the chalcopyrite flotation step may be obtained by calcination of limestone, and carbon dioxide obtained by such calcination is used for treating the pulp for the iron pyrite flotation. The result obtained by these tests equals that obtained in the at present actually operating plant of the company, in which plant, however, up to 6 kgs. of sulphuric acid are used per ton ore for acidifying the pulp for the iron pyrite flotation.

*Example 3*

An iron ore of the Dunderland, Norway, type is used. The ore contains about 33% iron, one half thereof in the form of magnetite and the other half in the form of hematite and 5 to 10% limestone. The pulp is treated by means of carbon dioxide and concentrated by flotation by means of activating substances for the iron oxides. Thus is avoided the use of mineral acids, which would dissolve lime minerals present, and would render difficult the flotation.

The above examples describe flotations using reagent types of cationic character. Experiments made with reagents of anionic character for flotation give satisfactory results when treating a pulp containing minerals giving Ca- and/or Mg solutions with addition of carbon dioxide for controlling Ca- and/or Mg-ions concentration.

An experimental result regarding flotation of iron ore from the Rana Mines is tabulated as follows:

| | Without $CO_2$ | With $CO_2$ |
|---|---|---|
| 1. Concentrate | 49.1% Fe | 58.2% Fe. |
| 2. Recovery | 67.0% Fe | 92.0% Fe. |
| 3. Scavenger | 37.7% Fe | 17.1% Fe. |
| 4. Recovery in scavenger | 9.7% Fe | 5.7% Fe. |
| 5. Recovery in 1 and 2 | 76.7% Fe | 97.1% Fe. |

I claim:

In the process of selective flotation of ores containing minerals, in which a calcium-basic pulp is used in a first stage and an acid pulp in a subsequent stage, the step of acidifying the calcium-basic pulp without freeing calcium ions comprising introducing $CO_2$ in the calcium-basic pulp until a desired pH value is obtained.

References Cited in the file of this patent

UNITED STATES PATENTS

| 1,488,745 | Ellis | Apr. 1, 1924 |
| 2,036,517 | Colman | Apr. 7, 1936 |
| 2,403,640 | Cunningham | July 9, 1946 |

OTHER REFERENCES

Quinn and Jones: "Carbon Dioxide" (c) 1936, by Reinhold Publishing Company, New York, N.Y., page 265.